W. HEBDON.

MACHINE FOR STEAMING CLOTH.

No. 6,981. Reissued March 7, 1876.

Witnesses.
Samᵘᵉˡ M. Barton
A. R. Davison

Inventor.
W. Hebdon.
by his Attys.
Lyndl D. Wright & Brown.

UNITED STATES PATENT OFFICE.

WILLIAM HEBDON, OF BOSTON, MASSACHUSETTS.

IMPROVEMENT IN MACHINES FOR STEAMING CLOTH.

Specification forming part of Letters Patent No. 146,674, dated January 20, 1874; reissue No. 6,981, dated March 7, 1876; application filed December 21, 1875.

*To all whom it may concern:*

Figure 1:
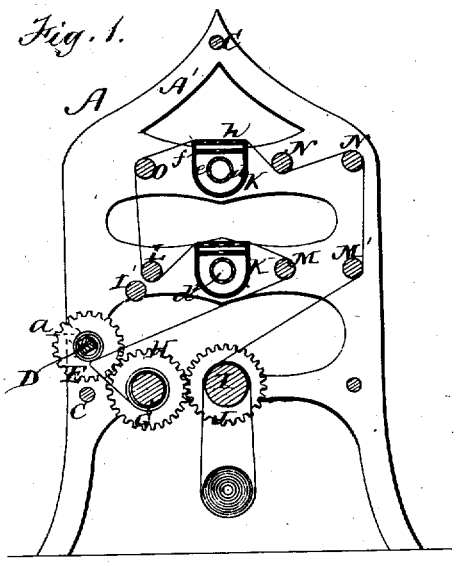
Figure 2:
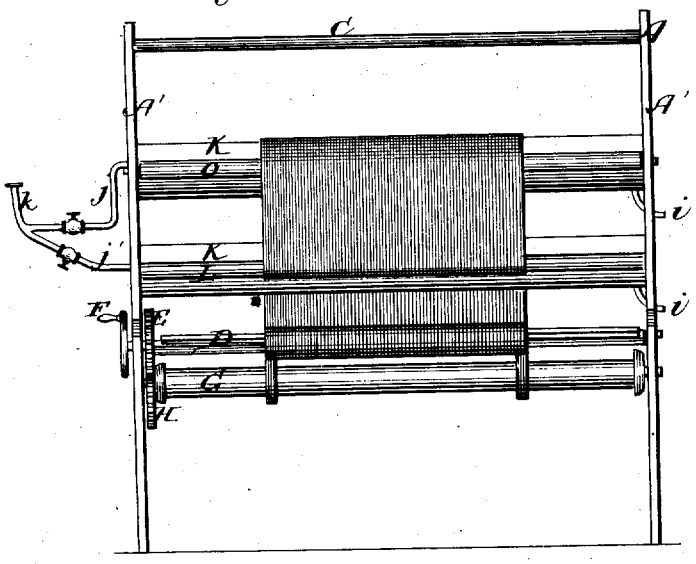
Figure 3:
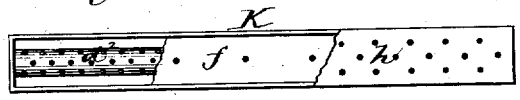

Be it known that I, WILLIAM HEBDON, of Boston, in the county of Suffolk and State of Massachusetts, have invented certain Improvements in Machine for Steam-Sponging Cloth, of which the following is a specification:

In the accompanying drawing, forming a part of this specification, Figure 1 represents a central vertical transverse section of my improved steam-sponging and listing machine. Fig. 2 represents a front view of the same. Fig. 3 represents a plan view of one of the steam-boxes; and Fig. 4 a view showing the winding-spit detached from the machine.

The invention has for its object, first, to provide for those engaged in finishing or sponging woolen cloth an improved machine adapted to unwind cloth, steam it on both sides, remove its selvages or listings, and wind it on an accumulating roll, and its selvages or listings on another; secondly, to provide means for enabling cloth to be removed in a compact form from a machine for steaming cloth, and obviating the necessity of unrolling the cloth in order to remove it.

To these ends, my invention consists, first, in the combination, in a machine for steam-sponging cloth, of certain devices whereby cloth is steamed on both sides, separated from its selvages, and wound on an accumulating spit or roll, the selvages being wound on a separate roll. It consists, secondly, in the employment in a machine for sponging or otherwise operating on cloth of an accumulating roll or spit, adapted first to be removed with the cloth wound thereon from its bearings in the frame-work of the machine, and, secondly, to be removed from the accumulation of cloth without unwinding the latter, the cloth being thus removed in a compact roll from the machine, all of which I will now proceed to describe.

Figure 4:
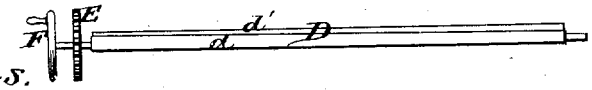

In the drawings, A represents the frame of the machine, which is preferably composed of two side pieces A′, connected by bars or rods C. D is a spit or mandrel extending across the frame A, and having journals which have bearings in recesses *a* in the frame, the spit being adapted to be removed bodily from the machine. The spit D is composed of two parts *d d′* adapted to be disconnected from each other, each being slightly wedge-shaped longitudinally, the two being placed together with the thick end of one against the thin end of the other, as shown in Fig. 4. The bearings of the spit D are made on the part *d*, which is also provided with a gear-wheel, E, and crank, F, or other means for rotating the spit D. Below and in the rear of the roller or spit D is located a listing or selvage roller, G, provided with a cog-wheel, H, that meshes with, and is operated by, the cog-wheel E. In advance of the roller G is an unwinding-roller, I, turning in the frame A, and having at one end a cog-wheel, J, that meshes with, and is operated by, the cog-wheel H. In the center, supported at each end of the frame A, and located one above the other, are steam-boxes, K K, each having a semicircular or other curved bottom, and a perforated tube, $d^2$, extending longitudinally within an outer metal casing, *e*, having an upper horizontal partition, *f*, to prevent the forcing out of the water condensed from the steam onto the cloth or other material, the said partition being formed with a suitable number of orifices to allow the escape of steam above the said partition to a passage or chamber formed between it and a perforated top or cover, *h*. Each of the boxes K is provided with an eduction-pipe, *i*. M′, N′, N, O, L, L′, and M are guide-rollers journaled in the frame A, in such relation to the steam-boxes K K as to guide the cloth over said boxes, substantially as shown in Fig. 1. Connected with the tubes of the steam-boxes K K are branch-pipes *j j′* provided with suitable, faucets, and connected with an induction-pipe, *k*, through which steam is admitted to the tubes.

The operation of my invention is as follows: The cloth to be steamed is guided from the unwinding-roller I to the winding-spit D by the guide-rollers N′ N O L M in such manner as to subject first one side of the cloth and then the other to the action of the steam-boxes K K, substantially as shown in Fig. 1. When the end of the cloth reaches the spit or winding-roll D, its selvages or listings are separated from the cloth at the end of the piece and conveyed to the listing-roller G, and by the rotation of the spit and listing roller the cloth is accumulated upon the spit and the selvages or listings upon the listing-roller, the selvages being automatically separated from the cloth by the rotation of the spit and listing-roller. The spit E is rotated by its crank F, or otherwise, rotary motion being imparted at the same time to the rollers G I by means of the cog-wheels E H J. The cloth is thus drawn over the steam-boxes, effectually steamed on both sides, and, after steaming, is divested of its selvages or listings, and wound compactly on the winding-spit E, all the operations being performed on the same machine. The cloth after being wound on the spit is adapted to be removed from the machine without unwinding, for the following reasons: First, the spit is removable from the machine, its journals resting in the notches or recesses *a* in the frame A. Secondly, the construction of the spit enables it to be removed from the roll of cloth by knocking out the part *d'*, its wedge-shape permitting it to be easily removed, as will be readily seen. Hence the cloth can be taken from the machine in a compact roll with the heat from the steam apparatus remaining in it, without being unwound, the cloth being smoothly rolled ready for the cutting-table, without the labor of unwinding it to remove it from the machine, and subsequently rewinding or rolling it for future use. By this means the cloth is enabled to be cooled slowly, which I have found to be a decided advantage.

I claim as my invention—

1. In a machine for steam-sponging cloth or other material, an unwinding-roller, I, a listing or selvage roller, G, and a winding spit or roller, D, in combination with suitable guide-rollers and a supporting-frame, all arranged and operating substantially as described.

2. The steam-boxes K K, combined with rollers I G D, guide-rollers L M, &c., and frame A, all arranged and operating substantially as described.

3. In a machine for steaming cloth, the combination, with the steaming apparatus, of a removable winding-spit, D, composed of two parts, *d d'*, adapted to be disconnected from each other and removed from a roll of cloth, substantially as described, for the purpose specified.

WILLIAM HEBDON.

Witnesses:
C. F. BROWN,
A. E. DENISON.